United States Patent
Takeo

[11] Patent Number: 5,940,527
[45] Date of Patent: Aug. 17, 1999

[54] METHOD AND APPARATUS FOR DETECTING PROSPECTIVE ABNORMAL PATTERNS

[75] Inventor: Hideya Takeo, Kanagawa-ken, Japan

[73] Assignee: Fuji Photo Film Co., Ltd., Kanagawa, Japan

[21] Appl. No.: 08/934,938

[22] Filed: Sep. 19, 1997

[30] Foreign Application Priority Data

Sep. 20, 1996 [JP] Japan .................................. 8-249347

[51] Int. Cl.$^6$ ...................................................... G06K 9/00
[52] U.S. Cl. ............................................ 382/132; 382/260
[58] Field of Search .................................. 382/132, 282, 382/260, 261, 197, 199, 205

[56] References Cited

U.S. PATENT DOCUMENTS

| | | | |
|---|---|---|---|
| 4,952,802 | 8/1990 | Adachi | 250/587 |
| 5,212,637 | 5/1993 | Saxena | 382/132 |
| 5,231,679 | 7/1993 | Matsuura et al. | 382/232 |
| 5,267,328 | 11/1993 | Gouge | 382/128 |
| 5,448,654 | 9/1995 | Katayama et al. | 415/119 |
| 5,481,623 | 1/1996 | Hara | 382/128 |
| 5,572,565 | 11/1996 | Abdel-Motaleb | 382/132 |
| 5,768,406 | 6/1998 | Abdel-Mottaleb | 382/132 |
| 5,784,482 | 7/1998 | Nakajima | 382/132 |

*Primary Examiner*—Amelia Au
*Assistant Examiner*—Samir Ahmed
*Attorney, Agent, or Firm*—Sughrue, Mion, Zinn, Macpeak & Seas, PLLC

[57] ABSTRACT

A value of the degree of centralization of gradient vectors, which has been calculated from an image signal, is compared with a threshold value, and a region of a prospective abnormal pattern is thereby determined. A picture element corresponding to a position, at which the center of gravity on the region of the prospective abnormal pattern is located, is taken as the picture element of interest, and a picture element corresponding to an end point that is associated with a mean value of index values for each radial direction line in iris filter processing, which mean value takes the maximum value, is thereby specified as a marginal point of the region of the prospective abnormal pattern in the direction along which the radial direction line extends. The thus set marginal points are connected by predetermined lines, and the region surrounded by the connecting lines is extracted as the prospective abnormal pattern. The contour shape of a prospective abnormal pattern having a shape with a special image density distribution is detected accurately.

8 Claims, 8 Drawing Sheets

FIG. 3A
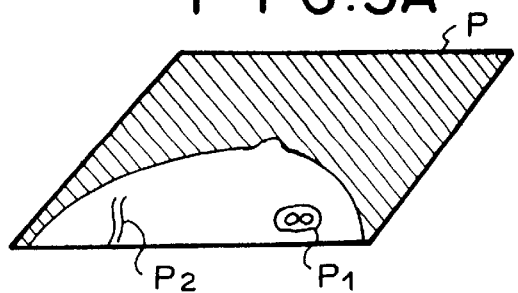
FIG. 3B
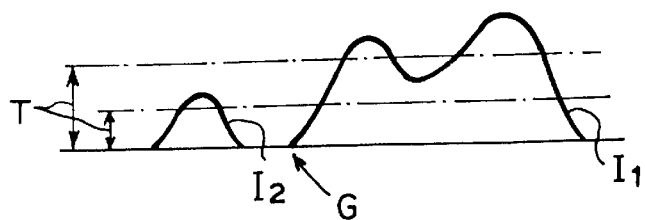
FIG. 3C
FIG. 3D
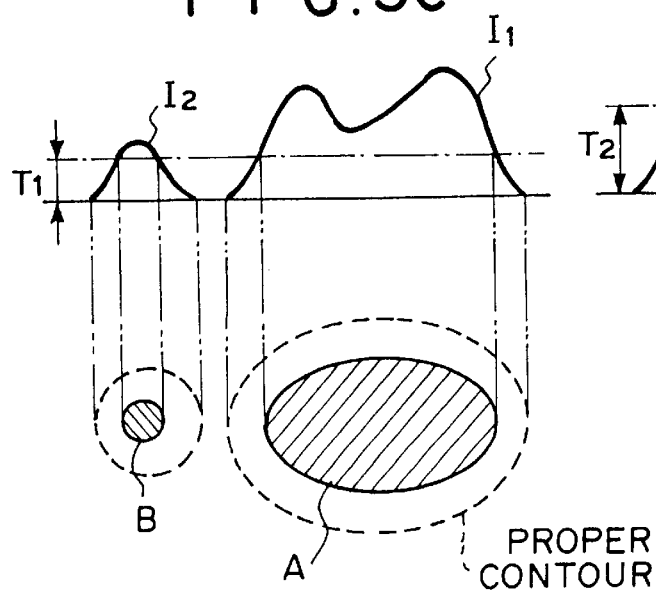
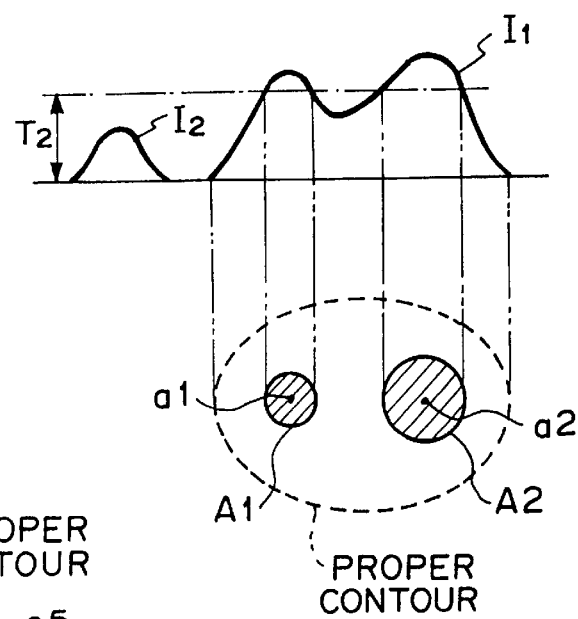
FIG. 3E
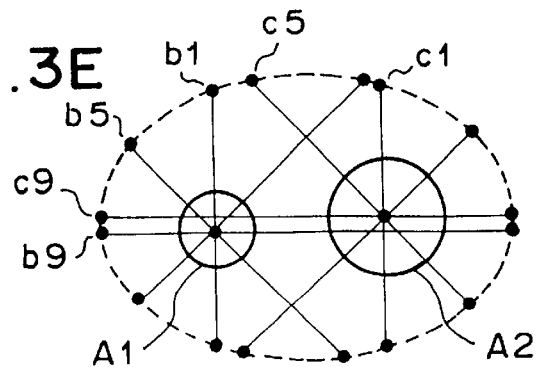

F I G. 6 PRIOR ART

| $f_7$ | $f_6$ | $f_5$ | $f_4$ | $f_3$ |
|---|---|---|---|---|
| $f_8$ | | | | $f_2$ |
| $f_9$ | | | | $f_1$ |
| $f_{10}$ | | | | $f_{16}$ |
| $f_{11}$ | $f_{12}$ | $f_{13}$ | $f_{14}$ | $f_{15}$ |

PICTURE ELEMENT j

METHOD AND APPARATUS FOR DETECTING PROSPECTIVE ABNORMAL PATTERNS

BACKGROUND OF THE INVENTION

1. Field of the Invention

This invention relates to a method and apparatus for detecting a prospective abnormal pattern, typically a tumor pattern, which is embedded in a radiation image.

2. Description of the Prior Art

Image processing, such as gradation processing or frequency processing, has heretofore been carried out on an image signal, which represents an image and has been obtained with one of various image obtaining methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

In such image processing, the processing is often carried out on the entire area of the image. Alternatively, in cases where the purpose of examination or diagnosis is clear to a certain extent, the emphasis processing is often carried out selectively on a desired image portion, which is adapted to the purpose of examination or diagnosis.

Ordinarily, when an image portion to be processed is to be selected, the person, who views the radiation image, views the original image before being processed and manually selects the image portion to be processed. However, there is the risk that the selected image portion or the specified image range will vary, depending upon the level of the experience or the image understanding capability of the person, who views the radiation image, and the selection cannot be carried out objectively.

For example, in cases where a radiation image has been recorded for the examination of breast cancer, it is necessary to find a tumor pattern, which is one of features of a cancerous portion, from the radiation image. However, the range of the tumor pattern cannot always be specified accurately. Therefore, there is a strong demand for techniques for accurately detecting an abnormal pattern, such as a tumor pattern, without depending upon the skill of the person, who views the radiation image.

In order to satisfy the demand described above, extensive research has been carried out to make computer aided diagnosis of medical images (CADM). With the CADM techniques, prospective abnormal patterns are detected automatically by utilizing computer processing. As one of the CADM techniques, iris filter processing has heretofore been proposed. [Reference should be made to "Detection of Tumor Patterns in DR Images (Iris Filter)," Obata, et al., Collected Papers of The Institute of Electronics and Communication Engineers of Japan, D-II, Vol. J75-D-II, No. 3, pp. 663–670, March 1992.] The iris filter processing has been studied as a technique efficient for detecting, particularly, a tumor pattern, which is one of characteristic forms of mammary cancers. However, the image to be processed with the iris filter is not limited to the tumor pattern in a mammogram, and the iris filter processing is applicable to any kind of image portion having the characteristics such that the gradients of the image signal (the image density, or the like) representing the image are centralized.

How the processing for detecting a prospective abnormal pattern with the iris filter is carried out will be described hereinbelow by taking the processing for the detection of the tumor pattern as an example.

It has been known that, for example, in a radiation image recorded on X-ray film (i.e., an image yielding an image signal of a high signal level for a high image density), the image density values of a tumor pattern are slightly smaller than the image density values of the surrounding image areas. The image density values of the tumor pattern are distributed such that the image density value becomes smaller from the periphery of an approximately circular tumor pattern toward the center point of the tumor pattern. Thus the distribution of the image density values of the tumor pattern has gradients of the image density values. Therefore, in the tumor pattern, the gradients of the image density values can be found in local areas, and the gradient lines (i.e., gradient vectors) centralize in the directions heading toward the center point of the tumor pattern.

The iris filter calculates the gradients of image signal values, which are represented by the image density values, as gradient vectors and feeds out the information representing the degree of centralization of the gradient vectors. With the iris filter processing. a tumor pattern is detected in accordance with the degree of centralization of the gradient vectors.

Specifically, by way of example, as illustrated in FIG. 5A, a tumor pattern $P_1$ may be embedded in a mammogram P. As illustrated in FIG. 5B, the gradient vector at an arbitrary picture element in the tumor pattern $P_1$ is directed to the vicinity of the center point of the tumor pattern $P_1$. On the other hand, as illustrated in FIG. 5C, in an elongated pattern $P_2$, such as a blood vessel pattern or a mammary gland pattern, gradient vectors do not centralize upon a specific point. Therefore, the distributions of the directions of the gradient vectors in local areas may be evaluated, and a region, in which the gradient vectors centralize upon a specific point, may be detected. The thus detected region may be taken as a prospective tumor pattern, which is considered as being a tumor pattern. As illustrated in FIG. 5D, in a pattern $P_3$, in which elongated patterns, such as mammary gland patterns, intersect each other, gradient vectors are liable to centralize upon a specific point. Therefore, the pattern $P_3$ may be detected as a false positive.

The processing with the iris filter is based on the fundamental concept described above. Steps of algorithms of the iris filter will be described hereinbelow.

(Step 1) Calculation of gradient vectors

For each picture element j among all of the picture elements constituting a given image, the direction θ of the gradient vector of the image signal representing the image is calculated with Formula (1) shown below.

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

As illustrated in FIG. 6, $f_1$ through $f_{16}$ in Formula (1) represent the picture element values (i.e., the image signal values) corresponding to the picture elements located at the peripheral areas of a mask, which has a size of, for example, five picture elements (located along the column direction of the picture element array) x five picture elements (located along the row direction of the picture element array) and which has its center at the picture element j.

(Step 2) Calculation of the degree of centralization of gradient vectors

Thereafter, for each picture element among all of the picture elements constituting the given image, the picture element is taken as a picture element of interest, and the degree of centralization C of the gradient vectors with respect to the picture element of interest is calculated with Formula (2) shown below.

$$C = (1/N) \sum_{j=1}^{N} \cos \theta_j \quad (2)$$

As illustrated in FIG. 7, in Formula (2), N represents the number of the picture elements located in the region inside of a circle, which has its center at the picture element of interest and has a radius R, and θj represents the angle made between the straight line, which connects the picture element of interest and each picture element j located in the circle, and the gradient vector at the picture element j, which gradient vector has been calculated with Formula (1). Therefore, in cases where the directions of the gradient vectors of the respective picture elements j centralize upon the picture element of interest, the degree of centralization C represented by Formula (2) takes a large value.

The gradient vector of each picture element j, which is located in the vicinity of a tumor pattern, is directed approximately to the center portion of the tumor pattern regardless of the level of the contrast of the tumor pattern. Therefore, it can be regarded that the picture element of interest associated with the degree of centralization C, which takes a large value, is the picture element located at the center portion of the tumor pattern. On the other hand, in a linear pattern, such as a blood vessel pattern, the directions of the gradient vectors are biased to a certain direction, and therefore the value of the degree of centralization C is small. Accordingly, a tumor pattern can be detected by taking each of all picture elements, which constitute the image, as the picture element of interest, calculating the value of the degree of centralization C with respect to the picture element of interest, and rating whether the value of the degree of centralization C is or is not larger than a predetermined threshold value. Specifically, the processing with the iris filter has the features over an ordinary difference filter in that the processing with the iris filter is not apt to be adversely affected by blood vessel patterns, mammary gland patterns, or the like, and can efficiently detect tumor patterns.

In actual processing, such that the detection performance unaffected by the sizes and shapes of tumor patterns may be achieved, it is contrived to adaptively change the size and the shape of the filter. FIG. 8 shows an example of the filter. The filter is different from the filter shown in FIG. 7. With the filter of FIG. 8, the degree of centralization is rated only with the picture elements, which are located along radial direction lines extending radially from a picture element of interest in M kinds of directions adjacent at $2\pi/M$ degree intervals. (In FIG. 8, by way of example, 32 directions at 11.25 degree intervals are shown.)

In cases where the picture element of interest has the coordinates (k, l), the coordinates ([x], [y]) of the picture element, which is located along an i'th radial direction line and is the n'th picture element as counted from the picture element of interest, are given by Formulas (3) and (4) shown below.

$$x = k + n \cos \{2\pi(i-1)/M\} \quad (3)$$

$$y = l + n \sin \{2\pi(i-1)/M\} \quad (4)$$

wherein [x] represents the maximum integer, which does not exceed x, and [y] represents the maximum integer, which does not exceed y.

Also, for each of the radial direction lines, the output value obtained for the picture elements ranging from a certain picture element to a picture element, which is located along the radial direction line and at which the maximum degree of centralization is obtained, is taken as the degree of centralization Cimax with respect to the direction of the radial direction line. The mean value of the degrees of centralization Cimax, which have been obtained for all of the radial direction lines, is then calculated. The mean value of the degrees of centralization Cimax having thus been calculated is taken as the degree of centralization C of the gradient vector group with respect to the picture element of interest.

Specifically, the degree of centralization Ci(n), which is obtained for the picture elements ranging from the picture element of interest to the n'th picture element located along the i'th radial direction line, is calculated with Formula (5) shown below.

$$Ci(n) = \sum_{i=1}^{n} \{(\cos \theta_{ii})/n\}, \; Rmin \leq n \leq Rmax \quad (5)$$

wherein Rmin and Rmax respectively represent the minimum value and the maximum value having been set for the radius of the tumor pattern, which is to be detected.

Specifically, with Formula (5), the degree of centralization Ci(n) is calculated with respect to all of the picture elements, which are located along each of the radial direction lines and fall within the range from a starting point to an end point, the starting point being set at the picture element of interest, the end point being set at one of picture elements that are located between a position at the length of distance corresponding to the minimum value Rmin having been set for the radius of the tumor pattern, which is to be detected, and a position at the length of distance corresponding to the maximum value Rmax.

Thereafter, the degree of centralization C of the gradient vector group is calculated with Formulas (6) and (7) shown below.

$$Ci_{max} = \max_{Rmin \leq n \leq Rmax} Ci(n) \quad (6)$$

$$C = (1/32) \sum_{i=1}^{32} Ci_{max} \quad (7)$$

The value of Cimax of Formula (6) represents the maximum value of the degree of centralization Ci(n) obtained for each of the radial direction lines with Formula (5). Therefore, the region from the picture element of interest to the picture element associated with the degree of centralization Ci(n), which takes the maximum value, may be considered as being the region of the prospective tumor pattern along the direction of the radial direction line.

The calculation with Formula (6) is made for all of the radial direction lines, and the contours (marginal points) of the regions of the prospective tumor pattern on all of the radial direction lines are thereby detected. The adjacent marginal points of the regions of the prospective tumor pattern on the radial direction lines are then connected by a straight line or a non-linear curve. In this manner, it is possible to specify the contour of the region, which may be regarded as the prospective tumor pattern.

Thereafter, with Formula (7), the mean value of the maximum values Cimax of the degrees of centralization within the aforesaid regions, which maximum values Cimax have been given by Formula (6) for all directions of the radial direction lines, is calculated. In Formula (7), by way of example, the radial direction lines are set along 32 directions. The calculated mean value serves as an output value I of the iris filter processing. The output value I is compared with a predetermined constant threshold value T, which is appropriate for making a judgment as to whether the detected pattern is or is not a prospective tumor pattern. In cases where I≧T, it is judged that the region having its center at the picture element of interest is a prospective abnormal pattern (a prospective tumor pattern). In cases where I<T, it is judged that the region having its center at the picture element of interest is not a prospective tumor pattern.

FIG. 9A shows a radiation image (a negative image recorded on photographic film) P, in which a pattern $P_0$ of the mamma serving as an object is embedded. By way of example, the iris filter processing may be carried out on the radiation image P. In such cases, as illustrated in FIGS. 9B and 9C, an output value $I_1$ is obtained for a tumor pattern $P_1$. By the comparison of the output value $I_1$ and the threshold value T with each other, a cross-sectional shape A, which is obtained by cutting out the distribution pattern of the output value $I_1$ by the threshold value T, is detected as being the region of the prospective tumor pattern.

The size and the shape of the region, in which the degree of centralization C of the gradient vector group with Formula (7) is rated, change adaptively in accordance with the distribution of the gradient vectors. Such an adaptive change is similar to the manner, in which the iris of the human s eye expands or contracts in accordance with the brightness of the external field. Therefore, the aforesaid technique for detecting the region of the prospective tumor pattern by utilizing the degrees of centralization of the gradient vectors is referred to as the iris filter processing.

The calculation of the degree of centralization Ci(n) may be carried out by using Formula (5') shown below in lieu of Formula (5).

$$Ci(n) = \frac{1}{n - Rmin + 1} \sum_{i=Rmin}^{n} \cos\theta_{il}, \ Rmin \leq n \leq Rmax \quad (5')$$

Specifically, with Formula (5'), the degree of centralization Ci(n) is calculated with respect to all of the picture elements, which are located along each of the radial direction lines and fall within the range from a starting point to an end point, the starting point being set at a picture element that is located at the length of distance corresponding to the minimum value Rmin having been set for the radius of the tumor pattern to be detected, which length of distance is taken from the picture element of interest, the end point being set at one of picture elements that are located between the position at the length of distance corresponding to the minimum value Rmin and the position at the length of distance corresponding to the maximum value Rmax, which length of distance is taken from the picture element of interest.

By carrying out the steps described above, the iris filter can efficiently detect only the tumor pattern, which has a desired size, from a radiation image. Research has heretofore been carried out on the iris filter particularly for the purpose of detecting a cancerous portion from a mammogram.

The output value I of the iris filter processing does not necessarily have the mountain-shaped distribution having a single peak as illustrated in FIG. 9B.

Specifically, it often occurs that, as illustrated in FIG. 3A, an abnormal pattern $P_1$ having an image density distribution with two minimum image density portions may be embedded in a radiation image P. In such cases, as illustrated in FIG. 3B, an output value obtained from the iris filter processing carried out on the radiation image P has a mountain-shaped distribution $I_1$, which has two peaks (two maximum portions). In such cases, as illustrated in FIG. 3C, if a judgment is made with a threshold value T1, which has been set to be a level such that it may cut out the base portion of the distribution pattern of the output value of the iris filter processing, the shape of the cut surface can be extracted as a single region A. However, as illustrated in FIG. 3D, if a judgment is made with a threshold value T2, which has been set to be a level such that it may cut out the portion in the vicinity of the peaks of the distribution pattern of the output value, the shapes of the cut surfaces will be extracted as two regions A1 and A2.

Also, if emphasis processing is carried out on the prospective abnormal patterns, which have been extracted as the two regions illustrated in FIG. 3D, an image will be formed which gives a feeling markedly different from the proper shape (the proper contour) of the region illustrated in FIG. 3C. In such cases, the problems occur in that an accurate diagnosis cannot be made easily.

In order for the aforesaid problems to be eliminated, the threshold value T may be set to be a level such that it may cut out the base portion of the distribution pattern of the output value of the iris filter processing. However, as illustrated in FIG. 3C, if the threshold value T is set to be small, besides the region A of the tumor pattern, a region B of a false positive, which is actually not the tumor pattern, is detected as the prospective abnormal pattern. In such cases, considerable time and labor will be required for a person who views the radiation image, such as a medical doctor, to make a judgment as to whether the detected pattern is a tumor pattern or a false positive. Further, in practice, it is impossible to previously set an appropriate level of the threshold value in accordance with the pattern having a special shape as described above.

SUMMARY OF THE INVENTION

The primary object of the present invention is to provide a method of detecting a prospective abnormal pattern, wherein a contour shape of a prospective abnormal pattern having a shape with a special image density distribution is detected accurately.

Another object of the present invention is to provide an apparatus for carrying out the method of detecting a prospective abnormal pattern.

The objects are accomplished by methods and apparatuses for detecting a prospective abnormal pattern in accordance with the present invention, wherein a region of a prospective abnormal pattern is obtained by carrying out threshold value processing on an output value I of iris filter processing, and the center of gravity on the region is calculated. A picture element corresponding to the position, at which the center of gravity is located, is taken as a picture element of interest. At this time, a picture element associated with a mean value of the degrees of centralization of image density gradient vectors upon the picture element of interest, as calculated with respect to each of radial direction lines in the iris filter processing, which mean value takes the maximum value, is specified. The thus specified picture element is set as a marginal point of the region of the prospective abnormal pattern along the radial direction line. The marginal points, which have thus been set on the radial direction lines, are then connected by straight lines or non-linear curves, and the margin (the contour) of the region of the prospective abnormal pattern is thereby determined accurately.

Specifically, the present invention provides a first method of detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the method comprising the steps of:

(1) for each picture element among all of the picture elements in the radiation image, calculating a gradient vector of the image signal, (2) setting an arbitrary picture element, which is among all of the picture elements in the radiation image, as a picture element of interest, (3) setting a plurality of (i number of) radial direction lines on the radiation image, the radial direction lines extending radially from the picture element of interest and being adjacent to one another at predetermined angle intervals, (4) calculating an index value $\cos\theta il$ for each picture element among the picture elements, which are located along each of the radial direction lines and fall within the range from the picture element of interest to a picture element that is located at a length of distance (Rmax) corresponding to the maximum size of the prospective abnormal pattern to be detected, the index value $\cos\theta il$ being calculated from an angle Oil that is made between the gradient vector, which has been calculated for each picture element, and the direction along which the radial direction line extends, (5) calculating a mean value of the index values $\cos\theta il$ having been calculated for the picture elements, which are located along each of the radial direction lines and fall within the range from a starting point to an end point, the starting point being set at the picture element of interest, the end point being set at one of the picture elements that are located between a position at a length of distance (Rmin) corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, (6) calculating the maximum value (Cimax of Formula (6)) of the mean values of the index values $\cos\theta il$, which mean values have been obtained for each of the radial direction lines by successively setting the end point at the picture elements, (7) calculating a total sum of the maximum values, which have been obtained for all of the plurality of the radial direction lines, a value of the degree of centralization of the gradient vector group with respect to the picture element of interest being thereby calculated, (8) comparing the value of the degree of centralization of the gradient vector group, which value has been calculated by the operation of step (7) defined above, and a predetermined threshold value with each other, (9) judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values $\cos\theta il$ having been calculated for each of the radial direction lines, which mean value takes the maximum value in the operation of step (6) defined above,

(13) setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and

(14) connecting the adjacent marginal points, which have been set on the plurality of the radial direction lines, by predetermined lines, the region surrounded by the connecting lines being extracted as the prospective abnormal pattern.

In the operation of step (7) defined above, in lieu of the total sum of the maximum values being calculated, the mean value of the maximum values may be calculated. Also, in the operation of step (8) defined above, the thus calculated mean value of the maximum values and the predetermined threshold value may be compared with each other.

Further, in the operation of step (14) defined above, the marginal points may be connected by straight lines or non-linear curves. Alternatively, dynamic contour extracting techniques may be employed, wherein a dynamic curve having an initial shape repeats deformation in accordance with a predetermined deformation tendency and converges, and discretely set marginal points are thereby connected smoothly by the dynamic curve.

In the dynamic contour extracting techniques, an imaginary curve (hereinbelow referred to as the dynamic curve), which repeats deformation in accordance with the predetermined deformation tendency, is set as a model of the contour to be extracted. The tendency of deformation is determined such that the contour model may become close to a target contour, i.e. such that the dynamic curve may repeat deformation and may ultimately converge to the target contour. In this manner, the target contour is extracted.

As one of the dynamic contour extracting techniques, a snakes model has heretofore been known. In the snakes model, the tendency of deformation is determined by defining energy of the dynamic curve and quantitatively rating the state of the dynamic curve. The energy of the dynamic curve is defined such that the level of energy may become minimum when the dynamic curve coincides with the target contour. The target contour can be extracted by finding the stable state, in which the level of energy of the dynamic curve becomes minimum. The speed and the accuracy, with which the contour extracting processing is carried out, depend upon how the tendency of deformation is determined. (The snakes model is described in, for example, "SNAKES: ACTIVE CONTOUR MODELS" by M. Kass, A. Witkin, D. Terzopoulos, International Journal of Computer Vision, Vol. 1, No. 4, pp. 321–331, 1988.)

In cases where the snakes model, which is one of the dynamic contour extracting techniques, is employed as a technique for connecting the marginal points, the marginal points on the radial direction lines can be connected smoothly, and the actual contour of the prospective abnormal pattern can be extracted accurately.

In the aforesaid first method of detecting a prospective abnormal pattern in accordance with the present invention, the starting point is set at the picture element of interest. A second method of detecting a prospective abnormal pattern in accordance with the present invention, which is described below, is the same as the first method of detecting a prospective abnormal pattern in accordance with the present invention, except that the starting point is set at a picture element located at a length of distance corresponding to the minimum size of the prospective abnormal pattern to be detected, which length of distance is taken from the picture element of interest.

Specifically, the present invention also provides a second method of detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the method comprising the steps of:

(1) for each picture element among all of the picture elements in the radiation image, calculating a gradient vector of the image signal, (2) setting an arbitrary picture element, which is among all of the picture elements in the radiation image, as a picture element of interest, (3) setting a plurality of radial direction lines on the radiation image, the radial direction lines extending radially from the picture element of interest and being adjacent to one another at predetermined angle intervals, (4) calculating an index value cos θil for each picture element among the picture elements, which are located along each of the radial direction lines and fall within the range from a picture element that is located at a length of distance corresponding to the minimum size of the prospective abnormal pattern to be detected, the length of distance being taken from the picture element of interest, to a picture element that is located at a length of distance corresponding to the maximum size of the prospective abnormal pattern to be detected, the length of distance being taken from the picture element of interest, the index value cos θil being calculated from an angle θil that is made between the gradient vector, which has been calculated for each picture element, and the direction along which the radial direction line extends, (5) calculating a mean value of the index values cos θil having been calculated for the picture elements, which are located along each of the radial direction lines and fall within the range from a starting point to an end point, the starting point being set at the picture element that is located at the length of distance corresponding to the minimum size of the prospective abnormal pattern to be detected, the end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, (6) calculating the maximum value of the mean values of the index values cos θil, which mean values have been obtained for each of the radial direction lines by successively setting the end point at the picture elements, (7) calculating a total sum (or a mean value) of the maximum values, which have been obtained for all of the plurality of the radial direction lines, a value of the degree of centralization of the gradient vector group with respect to the picture element of interest being thereby calculated, (8) comparing the value of the degree of centralization of the gradient vector group, which value has been calculated by the operation of step (7) defined above, and a predetermined threshold value with each other, (9) judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values cos θil having been calculated for each of the radial direction lines, which mean value takes the maximum value in the operation of step (6) defined above,

(13) setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and

(14) connecting the adjacent marginal points, which have been set on the plurality of the radial direction lines, by predetermined lines, the region surrounded by the connecting lines being extracted as the prospective abnormal pattern.

In the second method of detecting a prospective abnormal pattern in accordance with the present invention, in the operation of step (14) defined above, the marginal points may be connected by straight lines or non-linear curves. Alternatively, the dynamic contour extracting techniques, such as the snakes model, may be employed, wherein a dynamic curve having an initial shape repeats deformation in accordance with a predetermined deformation tendency and converges, and discretely set marginal points are thereby connected smoothly by the dynamic curve.

The present invention further provides a first apparatus for detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the apparatus comprising:

(i) a gradient vector calculating means for calculating a gradient vector of the image signal, the calculation being made for each picture element among all of the picture elements in the radiation image, (ii) a picture-element-of-interest setting means for setting an arbitrary picture element, which is among all of the picture elements in the radiation image, as a picture element of interest, the picture elements being successively set as the picture element of interest, (iii) a detection size setting means for setting the minimum size and the maximum size of the prospective abnormal pattern to be detected, (iv) a direction line setting means for setting a plurality of radial direction lines on the radiation image, the radial direction lines extending radially from the picture element of interest and being adjacent to one another at predetermined angle intervals, (v) an index value calculating means for calculating an index value $\cos \theta il$ for each picture element among the picture elements, which are located along each of the radial direction lines and fall within the range from the picture element of interest to a picture element that is located at a length of distance corresponding to the maximum size of the prospective abnormal pattern to be detected, the index value $\cos \theta il$ being calculated from an angle $\theta il$ that is made between the gradient vector, which has been calculated for each picture element, and the direction along which the radial direction line extends, (vi) a maximum value calculating means for calculating a mean value of the index values $\cos \theta il$ having been calculated for the picture elements, which are located along each of the radial direction lines and fall within the range from a starting point to an endpoint, the starting point being set at the picture element of interest, the end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, the maximum value calculating means extracting the maximum value of the mean values of the index values $\cos \theta il$, which mean values have been obtained for each of the radial direction lines by successively setting the end point at the picture elements, (vii) a centralization degree calculating means for calculating a total sum of the maximum values, which have been obtained for all of the plurality of the radial direction lines, and thereby calculating a value of the degree of centralization of the gradient vector group with respect to the picture element of interest, (viii) a comparison and judgment means for comparing the value of the degree of centralization of the gradient vector group, which value has been calculated by the centralization degree calculating means, and a predetermined threshold value with each other, the comparison and judgment means judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by the maximum value calculating means, the picture element corresponding to the end point being specified with respect to each of the radial direction lines, the marginal point setting means setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and (xi) a contour extracting means for connecting the adjacent marginal points, which have been set on the plurality of the radial direction lines, by predetermined lines, and extracting the region, which is surrounded by the connecting lines, as the prospective abnormal pattern.

In the first apparatus for detecting a prospective abnormal pattern in accordance with the present invention (and in a second apparatus for detecting a prospective abnormal pattern in accordance with the present invention, which is described below), the contour extracting means may connect the marginal points by straight lines or non-linear curves. Alternatively, the contour extracting means may employ the dynamic contour extracting techniques, such as the snakes model, in which a dynamic curve having an initial shape repeats deformation in accordance with a predetermined deformation tendency and converges, and in which discretely set marginal points are thereby connected smoothly by the dynamic curve.

A second apparatus for detecting a prospective abnormal pattern in accordance with the present invention is the same as the first apparatus for detecting a prospective abnormal pattern in accordance with the present invention, except for the index value calculating means and the maximum value calculating means.

Specifically, the present invention still further provides a second apparatus for detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the apparatus comprising:

(i) a gradient vector calculating means for calculating a gradient vector of the image signal, the calculation being made for each picture element among all of the picture elements in the radiation image, (ii) a picture-element-of-interest setting means for setting an arbitrary picture element, which is among all of the picture elements in the radiation image, as a picture element of interest, the picture elements being successively set as the picture element of interest, (iii) a detection size setting means for setting the minimum size and the maximum size of the prospective abnormal pattern to be detected, (iv) a direction line setting means for setting a plurality of radial direction lines on the radiation image, the radial direction lines extending radially from the picture element of interest and being adjacent to one another at predetermined angle intervals, (v) an index value calculating means for calculating an index value cos θil for each picture element among the picture elements, which are located along each of the radial direction lines and fall within the range from a picture element that is located at a length of distance corresponding to the minimum size of the prospective abnormal pattern to be detected, the length of distance being taken from the picture element of interest, to a picture element that is located at a length of distance corresponding to the maximum size of the prospective abnormal pattern to be detected, the length of distance being taken from the picture element of interest, the index value cos θil being calculated from an angle θil that is made between the gradient vector, which has been calculated for each picture element, and the direction along which the radial direction line extends, (vi) a maximum value calculating means for calculating a mean value of the index values cos θil having been calculated for the picture elements, which are located along each of the radial direction lines and fall within the range from a starting point to an endpoint, the starting point being set at the picture element that is located at the length of distance corresponding to the minimum size of the prospective abnormal pattern to be detected, the end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, the maximum value calculating means extracting the maximum value of the mean values of the index values cos θil, which mean values have been obtained for each of the radial direction lines by successively setting the end point at the picture elements, (vii) a centralization degree calculating means for calculating a total sum of the maximum values, which have been obtained for all of the plurality of the radial direction lines, and thereby calculating a value of the degree of centralization of the gradient vector group with respect to the picture element of interest, (viii) a comparison and judgment means for comparing the value of the degree of centralization of the gradient vector group, which value has been calculated by the centralization degree calculating means, and a predetermined threshold value with each other, the comparison and judgment means judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by the maximum value calculating means, the picture element corresponding to the end point being specified with respect to each of the radial direction lines, the marginal point setting means setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and (xi) a contour extracting means for connecting the adjacent marginal points, which have been set on the plurality of the radial direction lines, by predetermined lines, and extracting the region, which is surrounded by the connecting lines, as the prospective abnormal pattern.

With the methods and apparatuses for detecting a prospective abnormal pattern in accordance with the present invention, the region of the prospective abnormal pattern is obtained by carrying out threshold value processing on the output value of the iris filter processing, and the center of gravity on the region is calculated. The picture element corresponding to the position, at which the center of gravity is located, is taken as the picture element of interest. At this time, a picture element associated with the mean value of the degrees of centralization of image density gradient vectors upon the picture element of interest, as calculated with respect to each of radial direction lines in the iris filter processing, which mean value takes the maximum value, is specified. The thus specified picture element is set as a marginal point of the region of the prospective abnormal pattern along the radial direction line. The marginal points, which have thus been set on the radial direction lines, are then connected by straight lines or non-linear curves. In this manner, the margin (the contour) of the region of the prospective abnormal pattern can be determined accurately.

Specifically, the methods and apparatuses for detecting a prospective abnormal pattern in accordance with the present invention utilize the characteristics such that, as for the picture elements located within the region of the prospective abnormal pattern, regardless of which picture element located within the region of the prospective abnormal pattern is taken as the picture element of interest, the picture element associated with the mean value of the degrees of centralization of image density gradient vectors upon the picture element of interest, as calculated with respect to each of radial direction lines in the iris filter processing, which mean value takes the maximum value, is located at the margin of the region of the prospective abnormal pattern. As illustrated in FIG. 3D, it may occur that the region of the prospective abnormal pattern, which region is obtained by carrying out the threshold value processing on the output value of the iris filter processing, is divided into two regions.

In such cases, the picture element corresponding to the position, at which the center of gravity on either one of the two divided regions is located, may be taken as the picture element of interest. Also, with respect to the picture element of interest, the picture element associated with the mean value of the degrees of centralization of image density gradient vectors upon the picture element of interest, as calculated with respect to each of radial direction lines in the iris filter processing, which mean value takes the maximum value, may be specified. The thus specified picture element corresponds to the proper margin of the region of the prospective abnormal pattern.

Therefore, the contour of the prospective abnormal pattern can be determined by connecting the marginal points, which have thus been set on the radial direction lines, by utilizing, for example, the aforesaid dynamic contour extracting techniques. In this manner, the region of the prospective abnormal pattern can be detected accurately.

BRIEF DESCRIPTION OF THE DRAWINGS

FIG. 3A is an explanatory view showing a radiation image to be processed by the computer aided medical image diagnosing apparatus of FIG. 2, FIG. 3B is an explanatory view showing output values, which are obtained from iris filter processing carried out on the radiation image shown in FIG. 3A, and a threshold value T, FIGS. 3C and 3D are explanatory views showing regions, which are extracted by threshold value processing carried out on the output values of the iris filter processing, FIG. 3E is an explanatory view showing how marginal points of a region of a prospective abnormal pattern are set, FIG. 3A is an explanatory view showing a radiation image of the mamma (i.e., a mammogram), FIG. 6 is an explanatory view showing a mask, which is used for calculating gradient vectors in iris filter processing.

DESCRIPTION OF THE PREFERRED EMBODIMENTS

The present invention will hereinbelow be described in further detail with reference to the accompanying drawings.

Figure 1:
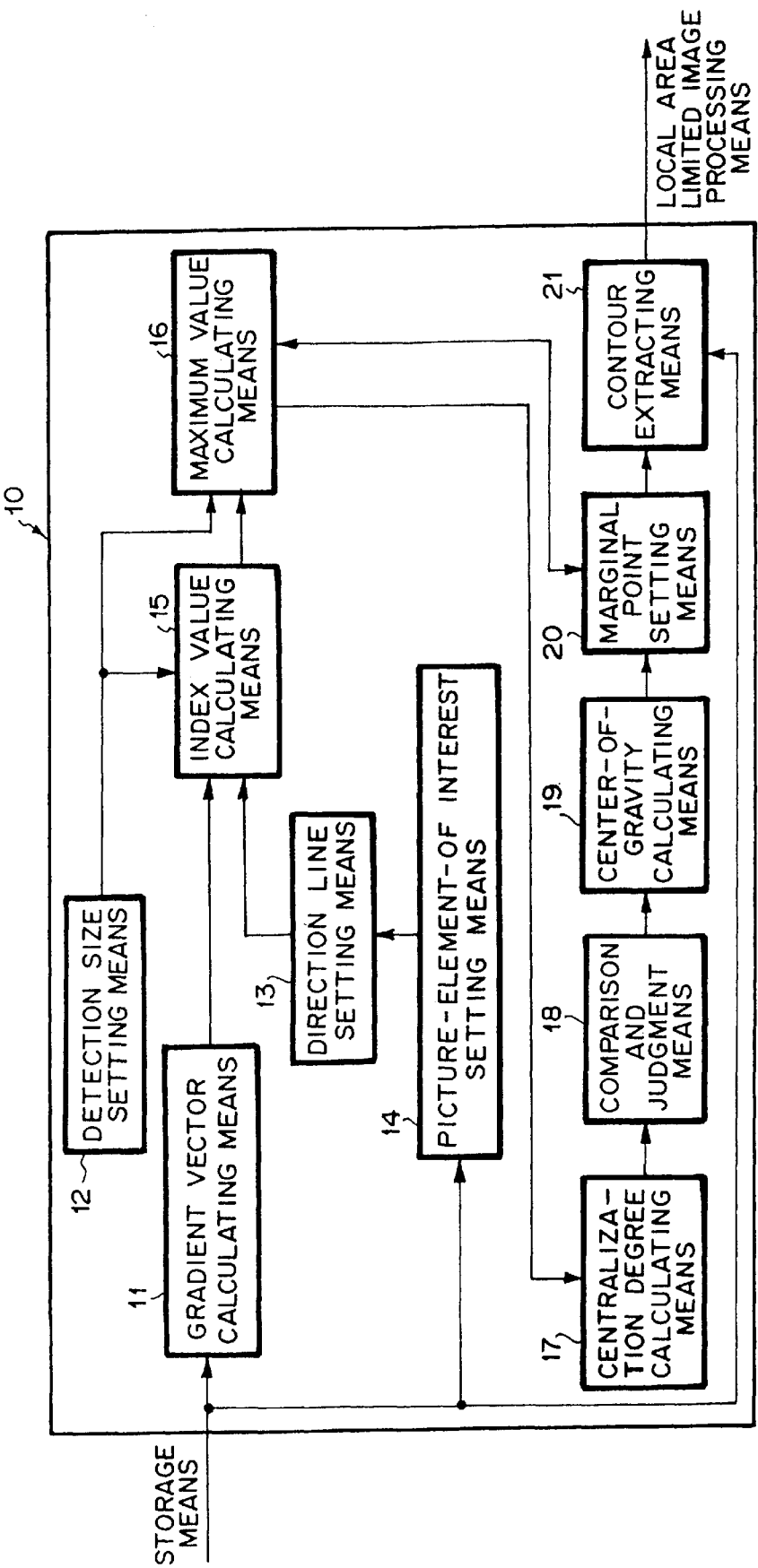
FIG. 1 is a schematic block diagram showing an embodiment of the first apparatus for detecting a prospective abnormal pattern in accordance with the present invention.
Figure 2:
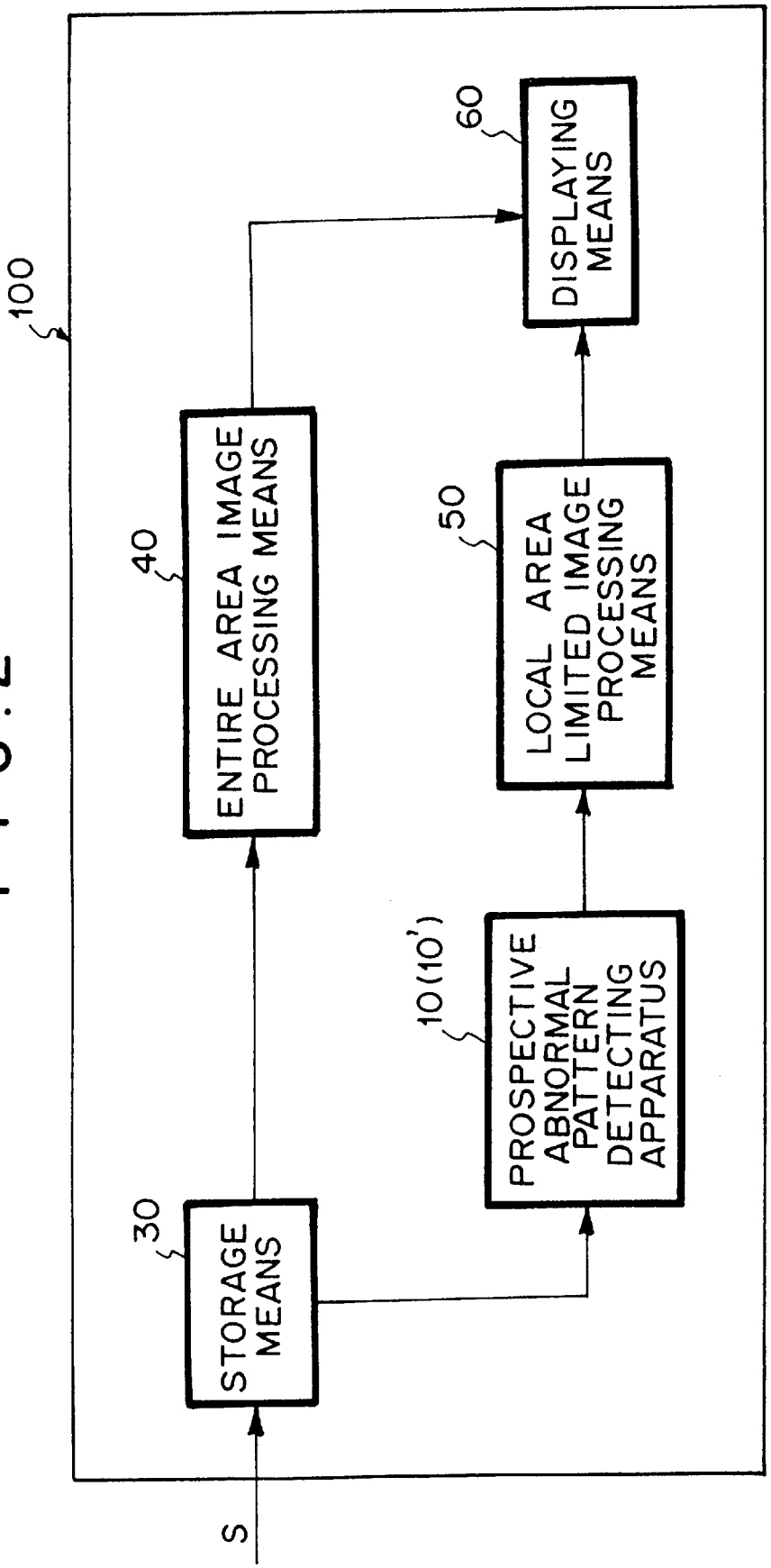
FIG. 2 is a block diagram showing an example of a computer aided medical image diagnosing apparatus, in which the prospective abnormal pattern detecting apparatus of FIG. 1 is employed.

FIG. 1 is a schematic block diagram showing an embodiment of the first apparatus for detecting a prospective abnormal pattern in accordance with the present invention. FIG. 2 is a block diagram showing an example of a computer aided medical image diagnosing apparatus, in which the prospective abnormal pattern detecting apparatus of FIG. 1 is employed.

With reference to FIG. 2, a computer aided medical image diagnosing apparatus 100 comprises a storage means 30 for storing a received image signal (hereinbelow referred to as the entire area image signal) S, and an entire area image processing means 40 for reading out the entire area image signal S from the storage means 30 and carrying out image processing, such as gradation processing or frequency processing, on the entire area image signal S. The computer aided medical image diagnosing apparatus 100 also comprises a prospective abnormal pattern detecting apparatus 10 for reading out the entire area image signal S from the storage means 30 and extracting an image signal (hereinbelow referred to as the local area limited image signal), which represents a prospective abnormal pattern (a prospective tumor pattern), from the entire area image signal S. The computer aided medical image diagnosing apparatus 100 further comprises a local area limited image processing means 50 for carrying out emphasis processing on the extracted local area limited image signal in order to emphasize the extracted prospective tumor pattern. The computer aided medical image diagnosing apparatus 100 still further comprises a displaying means 60 for displaying the entire area image, which has been obtained from the image processing carried out by the entire area image processing means 40, and the prospective tumor pattern, which has been obtained from the image processing carried out by the local area limited image processing means 50, as a visible image.

By way of example, as illustrated in FIG. 3A, an image P, which represents a mammogram of a patient, is stored on a stimulable phosphor sheet. The stimulable phosphor sheet, on which the image P representing the mammogram has been stored, is then exposed to stimulating rays, which cause the stimulable phosphor sheet to emit light in proportion to the amount of energy stored thereon during its exposure to radiation. The emitted light is photoelectrically detected, and the thus obtained image signal is converted into a digital image signal. The digital image signal (the image signal of a high image signal level for a high image density) is fed as the entire area image signal S into the computer aided medical image diagnosing apparatus 100. In the image P, a tumor pattern $P_1$ having an image density distribution with two minimum image density portions, a pattern $P_2$ of the mammary gland, and the like, are embedded.

With the displaying means 60, the entire area image and the prospective tumor pattern may be independently displayed on the displaying screen. However, in this embodiment, the entire area image is displayed, and the image portion corresponding to the prospective tumor pattern in the entire area image is replaced by the prospective tumor pattern, which has been obtained from the image processing carried out by the local area limited image processing means 50.

Figure 8:
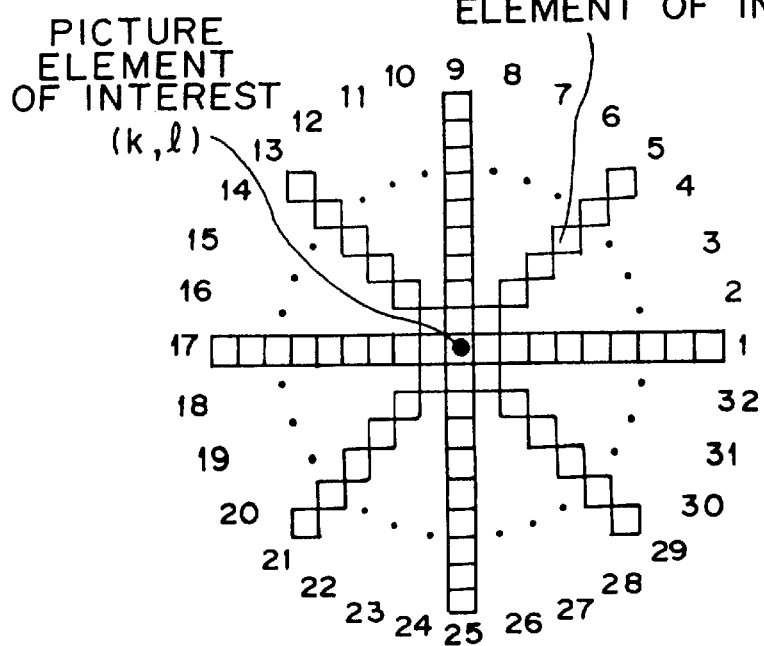
FIG. 8 is an explanatory view showing the concept behind an iris filter, which is set such that a contour shape may change adaptively.
Figure 9A:
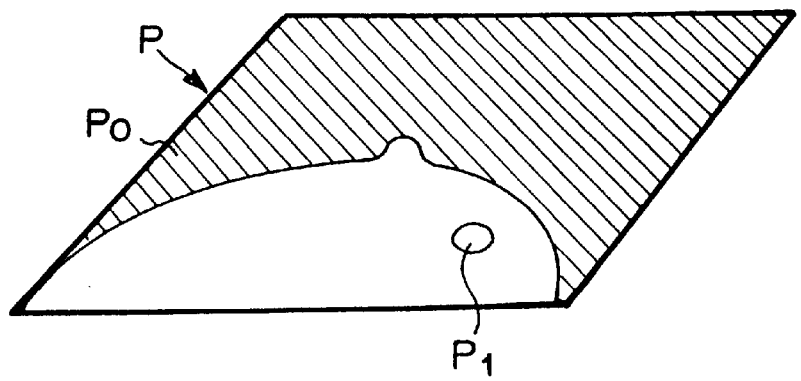
FIGS. 9A, 9B, and 9C are explanatory views showing the concept behind threshold value processing in iris filter processing.
Figure 9B:
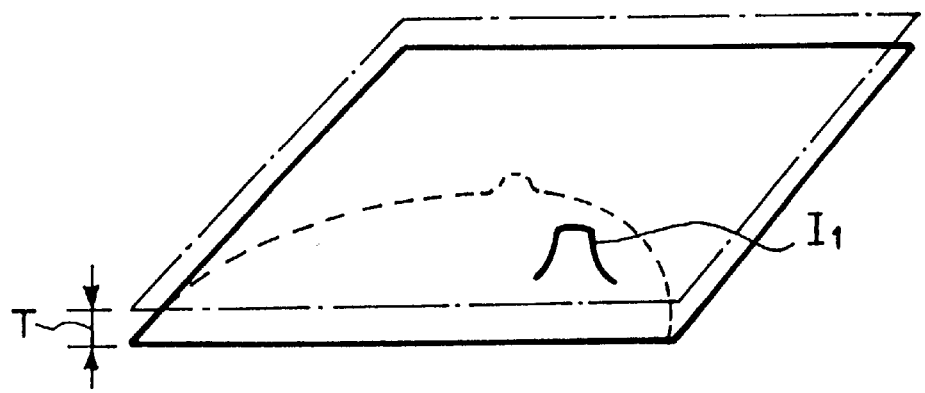
Figure 9C:
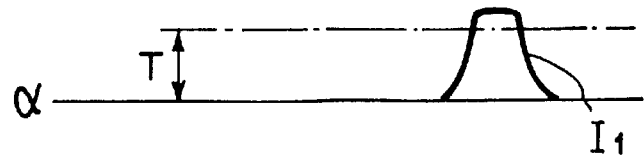

As illustrated in FIG. 1 in detail, the prospective abnormal pattern detecting apparatus 10 comprises a gradient vector calculating means 11 for calculating an image density gradient vector of the received image signal, the calculation being made for each picture element among all of the picture elements in the radiation image represented by the received image signal. The prospective abnormal pattern detecting apparatus 10 also comprises a picture-element-of-interest setting means 14 for setting an arbitrary picture element, which is among all of the picture elements in the radiation image, as a picture element of interest, the picture elements being successively set as the picture element of interest, and a detection size setting means 12 for setting the minimum size (a radius Rmin) and the maximum size (a radius Rmax) of the prospective tumor pattern to be detected. The prospective abnormal pattern detecting apparatus 10 further comprises a direction line setting means 13 for setting a plurality of (e.g., 32) radial direction lines (as illustrated in FIG. 8) on the radiation image, the radial direction lines extending radially from the picture element of interest, which has been set by the picture-element-of-interest setting means 14, and being adjacent to one another at predetermined angle intervals (e.g., at intervals of 11.25 degrees). The prospective abnormal pattern detecting apparatus 10 still further comprises an index value calculating means 15 for calculating an index value cos θil for each picture element among the picture elements, which are located along each of the radial direction lines and fall within the range from the picture element of interest to a picture element that is located at a length of distance corresponding to the maximum size Rmax of the prospective tumor pattern to be detected. The index value cos θil is calculated from an angle θil that is made between the gradient vector, which has been calculated for each picture element, and the direction along which the radial direction line extends. (The angle θil represents the angle that is made between the gradient vector, which has been calculated for an l'th picture element, as counted from the picture element of interest, on an i'th radial direction line among the 32 radial direction lines, and the direction along which the i'th radial direction line extends.) The prospective abnormal pattern detecting apparatus 10 also comprises a maximum value calculating means 16 for calculating a mean value Ci(n) of the index values cos θil having been calculated for the picture elements, which are located along each of the radial direction lines and fall within the range from a starting point to an end point, the starting point being set at the picture element of interest, the end point being set at one of the picture elements that are located between a position at a length of distance corresponding to the minimum size Rmin of the prospective tumor pattern to be detected and the position at the length of distance corresponding to the maximum size Rmax of the prospective tumor pattern to be detected. The mean value Ci(n) is calculated with Formula (5) shown below, and a plurality of the mean values Ci(n) are obtained for each of the radial direction lines by successively setting the end point at the picture elements. Also, the maximum value calculating means 16 extracts the maximum value Cimax of the mean values Ci(n) of the index values cos θil, which mean values have been obtained for each of the radial direction lines by successively setting the end point at the picture elements. The maximum value Cimax is extracted with Formula (6) shown below. The prospective abnormal pattern detecting apparatus 10 further comprises a centralization degree calculating means 17 for calculating an arithmetic mean value, (ΣCimax)/32, of the maximum values Cimax, which have been obtained for all of the 32 radial direction lines, and thereby calculating a value C of the degree of centralization of the gradient vector group with respect to the picture element of interest. The value C is calculated with Formula (7) shown below.

$$Ci(n) = \sum_{i=1}^{n} \{(\cos\theta_{il})/n\}, \; Rmin \leq n \leq Rmax \tag{5}$$

$$Ci_{\max} = \max_{Rmin \leq n \leq Rmax} Ci(n) \tag{6}$$

$$C = (1/32) \sum_{i=1}^{32} Ci_{\max} \tag{7}$$

The prospective abnormal pattern detecting apparatus 10 still further comprises a comparison and judgment means 18 for comparing the value C of the degree of centralization of the gradient vector group, which value has been calculated by the centralization degree calculating means 17, and a predetermined threshold value T with each other. In cases where the value C of the degree of centralization of the gradient vector group is not smaller than the predetermined threshold value T, the comparison and judgment means 18 judges that the picture element of interest is located within the region of the prospective tumor pattern. In cases where the value C of the degree of centralization of the gradient vector group is less than the predetermined threshold value T, the comparison and judgment means 18 judges that the picture element of interest is not located within the region of the prospective tumor pattern. The prospective abnormal pattern detecting apparatus 10 also comprises a center-of-gravity calculating means 19 for calculating the center of gravity on a region constituted of the picture elements, which have been judged as being located within the region of the prospective tumor pattern as a result of the operations for successively setting the picture element of interest at all of the picture elements in the radiation image by the picture-element-of-interest setting means 14 and for making judgments with respect to all of the picture elements in the radiation image by the comparison and judgment means 18. The prospective abnormal pattern detecting apparatus 10 further comprises a marginal point setting means 20 for taking a picture element corresponding to the position, at which the center of gravity is located, as the picture element of interest, and thereby specifying a picture element corresponding to the end point that is associated with the maximum value having been extracted by the maximum value calculating means 16, the picture element corresponding to the end point being specified with respect to each of the radial direction lines. Also, the marginal point setting means 20 sets the specified picture element, which corresponds to the end point on each of the radial direction lines, as a marginal point of the region of the prospective tumor pattern in the direction along which the radial direction line extends. A plurality of the marginal points are thereby set on the plurality of the radial direction lines. The prospective abnormal pattern detecting apparatus 10 still further comprises a contour extracting means 21 for connecting the adjacent marginal points, which have been set on the plurality of the radial direction lines, by predetermined non-linear curves in accordance with the dynamic contour extracting technique, and extracting the region, which is surrounded by the connecting curves, as the prospective tumor pattern.

Specifically, as illustrated in FIG. 6, the gradient vector calculating means 11 sets a mask, which has a size of, for example, five picture elements (located along the column direction of the picture element array)×five picture elements (located along the row direction of the picture element array) and which has its center at the picture element j. Also, for each picture element j among all of the picture elements constituting the image represented by the received image signal, the gradient vector calculating means 11 calculates the direction θ of the image density gradient vector of the image signal with Formula (1) shown below by using the image signal values (i.e., the picture element values) $f_1$ through $f_{16}$ corresponding to the picture elements located at the peripheral areas of the mask.

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

The mask size is not limited to five picture elements (located along the column direction of the picture element array)×five picture elements (located along the row direction of the picture element array), and may be selected from various different sizes.

The detection size setting means 12 sets the minimum size (the radius Rmin) and the maximum size (the radius Rmax) of the prospective tumor pattern to be detected. For this purpose, information representing the minimum size and the maximum size may be inputted by the operator from an input means (not shown), such as a keyboard, which is provided in the detection size setting means 12. Alternatively, information representing various sizes may be stored previously in the detection size setting means 12, and one of the sizes may be selected automatically in accordance with the kind of the image to be processed.

The number of the radial direction lines, which is set by the direction line setting means 13, is not limited to 32. However, if the number of the radial direction lines is very large, the amount of the calculation processing will become very large. If the number of the radial direction lines is very small, the contour shape of the prospective tumor pattern cannot be detected accurately. Therefore, the number of the radial direction lines should preferably be approximately 32. From the viewpoint of the calculation processing, or the like, the radial direction lines should preferably be set at equal angle intervals.

In the maximum value calculating means 16, in lieu of the starting point being set at the picture element of interest, the starting point may be set at a picture element located at a length of distance corresponding to the minimum size Rmin of the prospective tumor pattern to be detected, which length of distance is taken from the picture element of interest.

In such cases, in lieu of Formula (5), the mean value Ci(n) of the index values cos θil having been calculated for the picture elements, which are located along each of the radial direction lines and fall within the range from the starting point to the end point, is represented by Formula (5') shown below. The constitution for such processing constitutes an embodiment of the second apparatus for detecting a prospective abnormal pattern in accordance with the present invention.

$$Ci(n) = \frac{1}{n - Rmin + 1} \sum_{i=Rmin}^{n} \cos\theta_{il}, \; Rmin \leq n \leq Rmax \quad (5')$$

In the comparison and judgment means 18, the value C of the degree of centralization of the gradient vector group and the predetermined threshold value T are compared with each other. The term "predetermined threshold value" as used herein means the threshold value determined before an ultimate comparison is made. In this embodiment, several threshold values of different levels are prepared. The threshold value of each level is employed by way of trial, and a threshold value of a level is ultimately employed such that the number of detected prospective tumor patterns may fall within the range of seven to ten. The ultimately employed threshold value is also referred to as the predetermined threshold value.

As the dynamic contour extracting technique in the contour extracting means 21, the snakes model described above may be employed.

In the snakes model, the tendency of deformation is determined by defining energy of the dynamic curve and quantitatively rating the state of the dynamic curve. The energy of the dynamic curve is defined such that the level of energy may become minimum when the dynamic curve coincides with the target contour. The target contour can be extracted by finding the stable state, in which the level of energy of the dynamic curve becomes minimum. The level of energy is defined as the total sum of a plurality of levels of energy, which are defined in accordance with the states of the dynamic curve. The levels of energy, which are defined in accordance with the states of the dynamic curve, include a level of energy, which is defined in accordance with the characteristics of the dynamic curve, a level of energy, which is defined in accordance with limitations imposed upon the dynamic curve from the exterior, and the like.

In general, a point on the dynamic curve is represented by the formula shown below $$v(s) = (x(s), y(s))$$

by using a parameter s corresponding to the distance from a predetermined point on the dynamic curve, the distance being taken along the dynamic curve. Also, energy $E_{snakes}$ which the dynamic curve has is represented by the formula shown below.

$$Esnake = \int_0^1 Esnake(v(s))ds$$
$$= \int_0^1 \{Eint(v(s)) + Eimage(v(s)) + Eext(v(s))\}ds$$

wherein Eint represents the internal energy, Eimage represents the image energy, and Eext represents the external energy.

The internal energy Eint is the value for rating the characteristics of the dynamic curve. The characteristics have heretofore been rated as the "smoothness," and the internal energy is also referred to as the spline energy. The internal energy is defined such that it may take a small value for a smooth dynamic curve. In cases where deformation is carried out such that the internal energy may become small, the dynamic curve becomes smooth. The internal energy is represented by the formula shown below.

$$Eint = \{w_{sp1} \times |v_s(s)|^2 + w_{sp2} \times |v_{ss}(s)|^2\}/2$$

wherein $v_s(s) = dv(s)/ds$, $v_{ss}(s) = d^2v(s)/ds^2$, and each of $w_{sp1}$ and $w_{sp2}$ represents the parameter representing the weight of each term.

The image energy Eimage is the value for rating the effects of the image upon the dynamic curve. As the effects, the "image density gradient" has heretofore been utilized. Specifically, the characteristics such that the image density gradient at an image portion in the vicinity of the contour is sharper than the image density gradients at the other image portions. The image energy is defined such that it may take a small value for an image portion at which the image density gradient is sharp. As a result, the dynamic curve is brought to the contour as the deformation proceeds. The image energy is represented by the formula shown below.

$$Eimage = w_{grad} \times \{-grad^2 I(x, y)\}$$

wherein I (x, y) represents the image density at the point (x(s), y(s)), and $w_{grad}$ represents the parameter representing the weight.

The external energy Eext is the value for rating the limitations imposed intentionally by the operator. In general, as the limitations, a potential field specialized for each image, or the like, is employed. As in the two kinds of energy described above, the external energy is defined such that the dynamic curve may become close to the contour when the dynamic curve is deformed such that the external energy may become small. However, the external energy can be defined arbitrarily as a design item and lacks general-purpose properties. Therefore, In this embodiment, the external energy is ignored (Eext=0).

Specifically, with respect to the marginal points having been set, an initial dynamic curve (initial snakes) is set. The initial dynamic curve has n number of nodes on the circumference of a circle having a radius Rmax and having its center at the position, at which the calculated center of gravity is located. A contraction repeating process is carried out until the dynamic curve converges. When the dynamic curve has converged, the nodes are connected with one another, and the picture elements falling within the region surrounded by the connecting curves are extracted.

How the prospective abnormal pattern detecting apparatus 10 operates will be described hereinbelow.

The entire area image signal S, which has been inputted from the storage means 30 into the prospective abnormal pattern detecting apparatus 10, is fed into the gradient vector calculating means 11, the picture-element-of-interest setting means 14, and the contour extracting means 21. As described above, the gradient vector calculating means 11 sets the mask, which has a size of five picture elements (located along the column direction of the picture element array)×five picture elements (located along the row direction of the picture element array). Also, for each picture element among all of the picture elements constituting the image represented by the received image signal, the gradient vector calculating means 11 calculates the direction θ of the image density gradient vector of the image signal by using the image signal values (i.e., the picture element values) corresponding to the picture elements located at the peripheral areas of the mask. Information representing the calculated direction θ of the image density gradient vector is fed into the index value calculating means 15.

The picture-element-of-interest setting means 14 sets an arbitrary picture element, which is among all of the picture elements in the radiation image represented by the received image signal, as the picture element of interest. The picture elements are successively set as the picture element of interest. Information representing the thus set picture element of interest is fed into the direction line setting means 13. The direction line setting means 13 sets the 32 radial direction lines on the radiation image, the radial direction lines extending radially from the set picture element of interest and being adjacent to one another at equal angle intervals of, e.g., 11.25 degrees. Information representing the set radial direction lines is fed into the index value calculating means 15.

Information representing the minimum size (the radius Rmin) and the maximum size (the radius Rmax) of the prospective tumor pattern to be detected by the prospective abnormal pattern detecting apparatus 10 is inputted by the operator into the detection size setting means 12. The information representing the minimum size Rmin and the maximum size Rmax is also fed into the index value calculating means 15.

The index value calculating means 15 superposes the 32 radial direction lines, which have been set by the direction line setting means 13, upon the picture elements, which are arrayed in the two-dimensional array as in the image signal and for which the directions θ of the gradient vectors have been calculated by the gradient vector calculating means 11. Also, the index value calculating means 15 extracts the picture elements located on each of the 32 radial direction lines.

Further, the index value calculating means 15 calculates the index value cos θil for each picture element among the picture elements, which are located along each of the radial direction lines and fall within the range from the picture element of interest to a picture element that is located at the length of distance corresponding to the maximum size Rmax of the prospective tumor pattern to be detected. The index value cos θil is calculated from the angle θil that is made between the direction θ of the gradient vector, which has been calculated for each picture element, and the direction along which the radial direction line extends. (The angle θil represents the angle that is made between the gradient vector, which has been calculated for an l'th picture element, as counted from the picture element of interest, on an i'th radial direction line among the 32 radial direction lines, and the direction along which the i'th radial direction line extends.)

Information representing the index values cos θil having been calculated for the picture elements, which are located along each of the radial direction lines, is fed into the maximum value calculating means 16. The maximum value calculating means 16 calculates the mean value Ci(n) of the index values cos θil having been calculated for the picture elements, which are located along each of the radial direction lines and fall within the range from a starting point to an endpoint, the starting point being set at the picture element of interest, the end point being set at one of the picture elements that are located between a position at the length of distance corresponding to the minimum size Rmin of the prospective tumor pattern to be detected and the position at the length of distance corresponding to the maximum size Rmax of the prospective tumor pattern to be detected. A plurality of the mean values Ci(n) are obtained for each of the radial direction lines by successively setting the end point at the picture elements. Also, the maximum value calculating means 16 extracts the maximum value Cimax of the mean values Ci(n) of the index values cos θil, which mean values have been obtained for each of the radial direction lines by successively setting the end point at the picture elements.

The mean value Ci(n) takes the maximum value Cimax in cases where the picture element at the end point is located at the margin of the tumor pattern $P_1$, i.e. in cases where the picture element at the end point corresponds to a rising point G in the distribution of the output value $I_1$ (=C) of the iris filter processing illustrated in FIG. 3B.

Information representing the maximum value Cimax, which has been extracted for each of the radial direction lines, is fed into the centralization degree calculating means 17. The centralization degree calculating means 17 calculates the arithmetic mean value of the maximum values Cimax, which have been obtained for all of the 32 radial direction lines, and thereby calculates the value C of the degree of centralization of the gradient vector group with respect to the picture element of interest.

Information representing the value C of the degree of centralization of the gradient vector group with respect to the picture element of interest is fed into the comparison and judgment means 18.

The same operations as those described above are carried out by successively setting the picture element of interest at different picture elements in the picture-element-of-interest setting means 14. Information representing the values C of the degrees of centralization, which have been calculated with respect to all of the picture elements in the radiation image, is fed into the comparison and judgment means 18.

The comparison and judgment means 18 compares the value C of the degree of centralization of the gradient vector group and an initially set threshold value T with each other. In cases where C≧T, the comparison and judgment means 18 judges that the picture element of interest is located within the region of the prospective tumor pattern. In cases where C<T, the comparison and judgment means 18 judges that the picture element of interest is not located within the region of the prospective tumor pattern.

The initially set threshold value T is not necessarily an appropriate value. Specifically, if the threshold value T is very small, even a picture element, which is not located within the region of the tumor pattern $P_1$ and is located within the region of the mammary gland pattern $P_2$ (corresponding to the output value $I_2$ of the iris filter processing), will be judged as being located within the region of the tumor pattern $P_1$.

Therefore, the comparison and judgment means 18 adjusts the level of the threshold value such that the number of the regions, which are constituted of the picture elements having been judged as being located within the region of the prospective tumor pattern, may fall within the range of seven to ten. Information representing the region constituted of the picture elements, which have been judged as being located within the region of the prospective tumor pattern as a result of the processing with the adjusted threshold value T, is fed into the center-of-gravity calculating means 19.

As illustrated in FIG. 3D, in cases where the threshold value, which has been set such that the number of the detected regions falls within the range of seven to ten, is equal to T2, the two peak portions of the distribution pattern of the value C (=I) of the degree of centralization in the tumor pattern $P_1$ are cut out by the level of the threshold value T2. As a result, the proper region of the tumor pattern $P_1$, which is indicated by the broken line in FIG. 3D, is extracted as two regions A1 and A2.

The center-of-gravity calculating means 19 calculates the center of gravity on each of the seven to ten regions, which have been detected in the manner described above. For example, as for the region A1, the center of gravity a1 is calculated. As for the region A2, the center of gravity a2 is calculated. Also, as for each of the other seven to eight regions of prospective tumor patterns (prospective abnormal patterns), the center of gravity is calculated.

Information representing the center of gravity is fed into the marginal point setting means 20. From the maximum value calculating means 16, the marginal point setting means 20 receives the information representing a picture element corresponding to the end point that is associated with the maximum value Cimax of the mean values Ci(n) for each of the radial direction lines, the maximum value Cimax having been extracted by the maximum value calculating means 16, when a picture element corresponding to the position, at which the center of gravity is located, is taken as the picture element of interest. The picture element corresponding to the end point is thus specified with respect to each of the radial direction lines.

As described above, the picture element corresponding to the end point, which is associated with the maximum value Cimax of the mean values Ci(n) for each of the radial direction lines, represents the margin of the prospective tumor pattern. Therefore, as illustrated in FIG. 3E, when the picture element corresponding to the position, at which the center of gravity a1 on the region A1 is located, is taken as the picture element of interest, the picture elements b1, b2, ..., b32 corresponding to the end points, which are associated with the maximum values Cimax of the mean values Ci(n) for the radial direction lines, are located on the proper margin of the tumor pattern $P_1$. Also, when the picture element corresponding to the position, at which the center of gravity a2 on the region A2 is located, is taken as the picture element of interest, the picture elements c1, c2, ..., c32 corresponding to the end points, which are associated with the maximum values Cimax of the mean values Ci(n) for the radial direction lines, are located on the proper margin of the tumor pattern $P_1$.

Figure 4A:
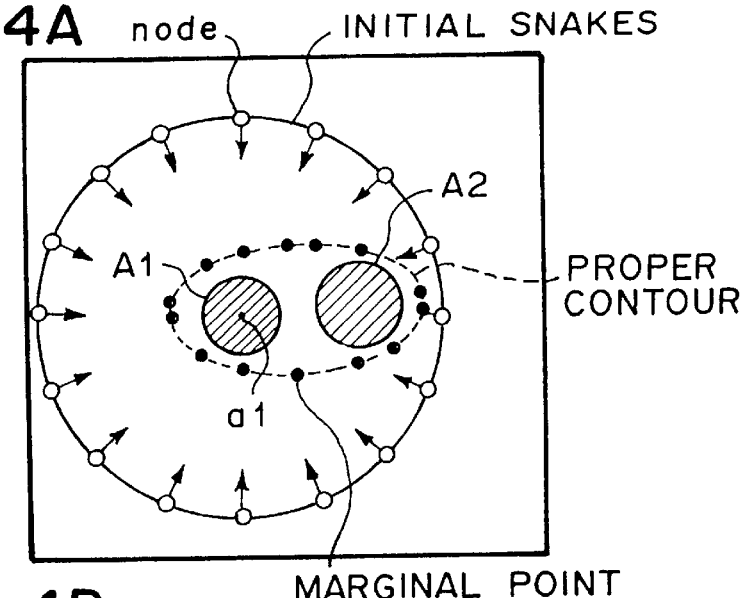
FIGS. 4A, 4B, and 4C are explanatory views showing how a snakes model operates.
Figure 4B:
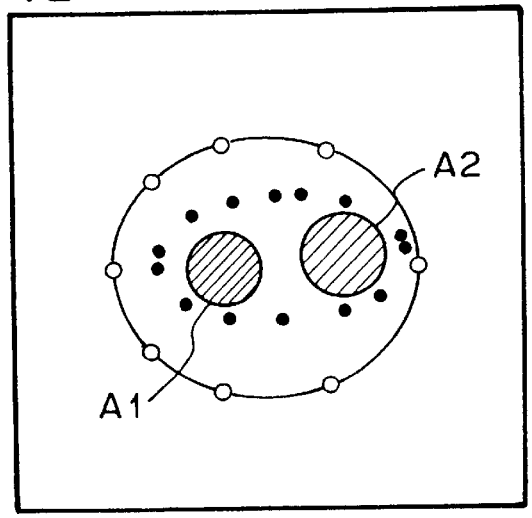
Figure 4C:
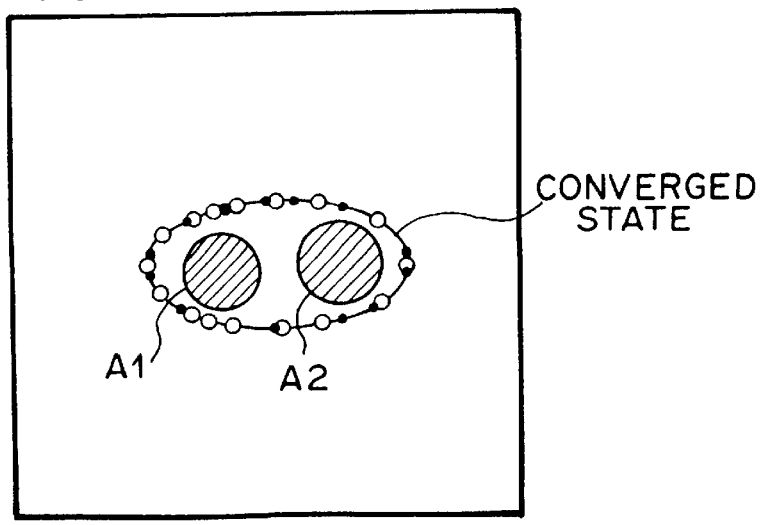
Figure 5A:
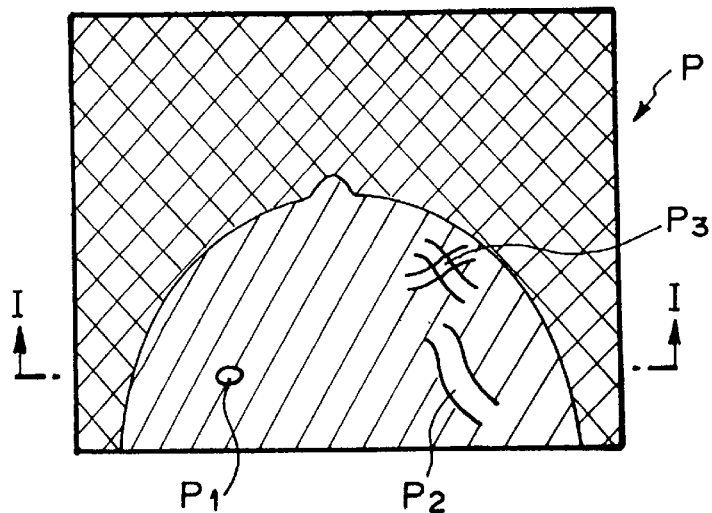
FIG. 5B is an explanatory view showing the degree of centralization of gradient vectors in a tumor pattern.
FIG. 5C is an explanatory view showing the degree of centralization of gradient vectors in an elongated pattern, such as a blood vessel pattern or a mammary gland pattern.
FIG. 5D is an explanatory view showing the degree of centralization of gradient vectors in a portion at which two elongated patterns, such as mammary gland patterns, intersect each other.
Figure 5B:
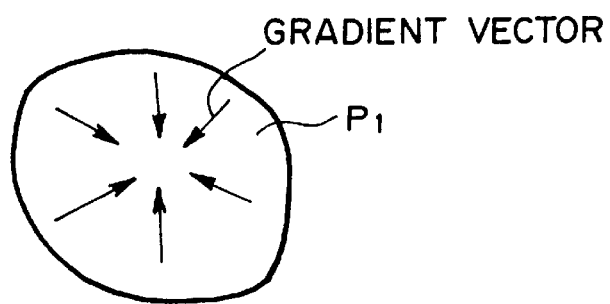
Figure 5C:
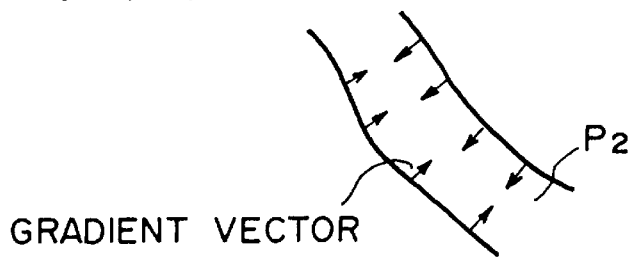
Figure 5D:
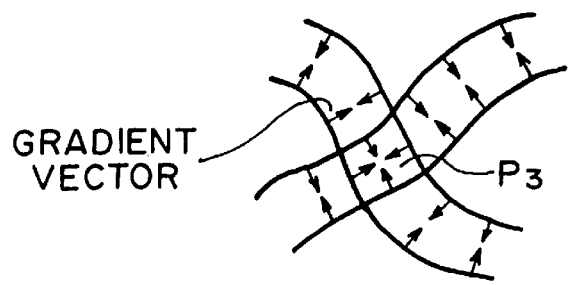
Figure 7:
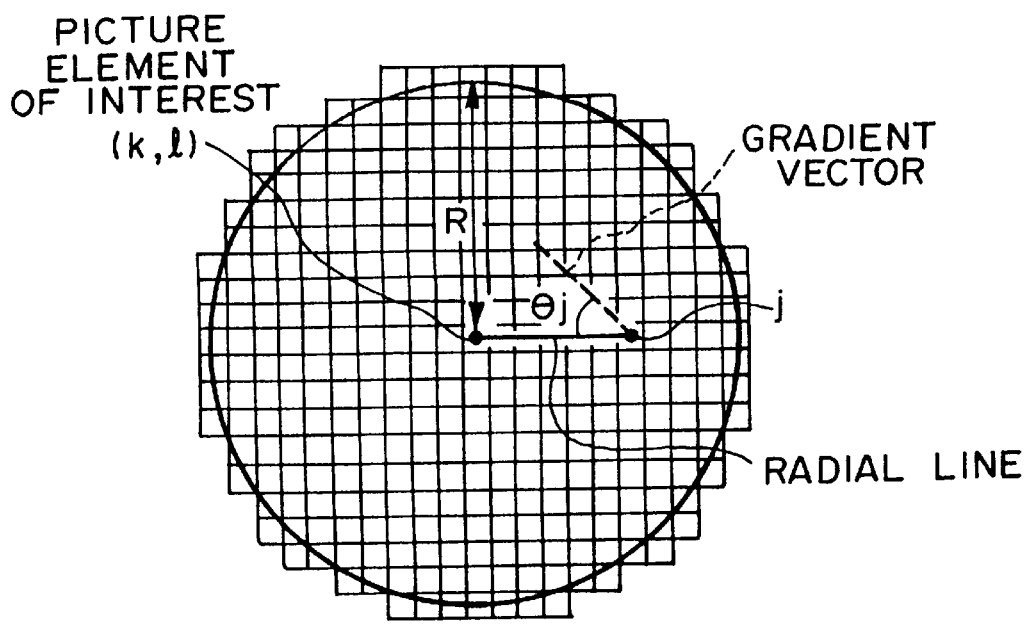
FIG. 7 is an explanatory view showing the concept behind the degree of centralization of a gradient vector with respect to a picture element of interest.

As illustrated in FIG. 4A, with respect to the picture elements (the marginal points) located on the margin of each prospective tumor pattern, the contour extracting means 21 sets the initial dynamic curve (initial snakes). The initial dynamic curve has n number of nodes on the circumference of the circle having the radius Rmax and having its center at the position, at which the calculated center of gravity is located. Also, as illustrated in FIG. 4B, the contraction repeating process is carried out until the dynamic curve converges. As illustrated in FIG. 4C, when the dynamic curve has converged, the nodes are connected with one another, and the region surrounded by the connecting curves is extracted as the prospective tumor pattern.

By the operations described above, even if the threshold value was not set to be an appropriate level, the contour shape of the prospective tumor pattern $P_1$ can be detected accurately.

The image signal representing the prospective tumor pattern, the contour of which has thus been extracted accurately by the prospective abnormal pattern detecting apparatus 10, is fed into the local area limited image processing means 50. In the local area limited image processing means 50, the received image signal is subjected to emphasis processing for emphasizing the prospective tumor pattern. The image signal having been obtained from the emphasis processing is fed into the displaying means 60.

Also, in the entire area image processing means 40, image processing, such as gradation processing or frequency processing, for obtaining an entire area image having good image quality is carried out on the entire area image signal S. The entire area image signal S having been obtained from the image processing is fed from the entire area image processing means 40 into the displaying means 60. On the displaying means 60, the entire area image, which is represented by the entire area image signal S, is displayed, such that the image portion corresponding to the prospective tumor pattern in the entire area image may be replaced by the prospective tumor pattern, which has been obtained from the image processing carried out by the local area limited image processing means 50. The displayed visible image is used by a person, who views the radiation image, such as a medical doctor, in making a diagnosis of the tumor pattern.

In the embodiment described above, the maximum value calculating means 16 sets the starting point at the picture element of interest. In lieu of the starting point being set at the picture element of interest, the starting point may be set at the picture element located at the length of distance corresponding to the minimum size Rmin of the prospective tumor pattern to be detected, which length of distance is taken from the picture element of interest. Specifically, in a prospective abnormal pattern detecting apparatus 10', a maximum value calculating means 16' for carrying out such an operation may be employed in lieu of the aforesaid maximum value calculating means 16. The prospective abnormal pattern detecting apparatus 10' constitutes an embodiment of the second apparatus for detecting a prospective abnormal pattern in accordance with the present invention. The other constitution, the operations, and the effects of the embodiment of the second apparatus for detecting a prospective abnormal pattern in accordance with the present invention are the same as those in the aforesaid embodiment of the first apparatus for detecting a prospective abnormal pattern in accordance with the present invention.

In the aforesaid embodiments of the first and second apparatuses for detecting a prospective abnormal pattern in accordance with the present invention, the mammogram is processed. However, the methods and apparatuses for detecting a prospective abnormal pattern in accordance with the present invention are also applicable when images other than the mammogram are processed.

What is claimed is:

1. A method of detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the method comprising the steps of:

(1) for each picture element among all of the picture elements in the radiation image, calculating a gradient vector of the image signal, (2) setting an arbitrary picture element, which is among all of the picture elements in the radiation image, as a picture element of interest, (3) setting a plurality of radial direction lines on the radiation image, said radial direction lines extending radially from said picture element of interest and being adjacent to one another at predetermined angle intervals, (4) calculating an index value $\cos \theta il$ for each picture element among the picture elements, which are located along each of said radial direction lines and fall within the range from said picture element of interest to a picture element that is located at a length of distance corresponding to the maximum size of the prospective abnormal pattern to be detected, said index value $\cos \theta il$ being calculated from an angle $\theta il$ that is made between said gradient vector, which has been calculated for said each picture element, and the direction along which said each radial direction line extends, (5) calculating a mean value of the index values $\cos \theta il$ having been calculated for the picture elements, which are located along each of said radial direction lines and fall within the range from a starting point to an end point, said starting point being set at said picture element of interest, said end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, (6) calculating the maximum value of said mean values of said index values $\cos \theta il$, which mean values have been obtained for each of said radial direction lines by successively setting said end point at the picture elements, (7) calculating a total sum of the maximum values, which have been obtained for all of the plurality of said radial direction lines, a value of the degree of centralization of the gradient vector group with respect to said picture element of interest being thereby calculated, (8) comparing the value of said degree of centralization of the gradient vector group, which value has been calculated by the operation of step (7) defined above, and a predetermined threshold value with each other, (9) judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values $\cos \theta il$ having been calculated for each of said radial direction lines, which mean value takes the maximum value in the operation of step (6) defined above,

(13) setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and

(14) connecting the adjacent marginal points, which have been set on the plurality of said radial direction lines, by predetermined lines, the region surrounded by the connecting lines being extracted as the prospective abnormal pattern.

2. A method as defined in claim 1 wherein the connection of the marginal points in the operation of step (14) defined above is carried out with a technique, in which a dynamic curve having an initial shape repeats deformation in accordance with a predetermined deformation tendency and converges.

3. A method of detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the method comprising the steps of:

(1) for each picture element among all of the picture elements in the radiation image, calculating a gradient vector of the image signal, (2) setting an arbitrary picture element, which is among all of the picture elements in the radiation image, as a picture element of interest, (3) setting a plurality of radial direction lines on the radiation image, said radial direction lines extending radially from said picture element of interest and being adjacent to one another at predetermined angle intervals, (4) calculating an index value cos θil for each picture element among the picture elements, which are located along each of said radial direction lines and fall within the range from a picture element that is located at a length of distance corresponding to the minimum size of the prospective abnormal pattern to be detected, the length of distance being taken from said picture element of interest, to a picture element that is located at a length of distance corresponding to the maximum size of the prospective abnormal pattern to be detected, the length of distance being taken from said picture element of interest, said index value cos θil being calculated from an angle θil that is made between said gradient vector, which has been calculated for said each picture element, and the direction along which said each radial direction line extends, (5) calculating a mean value of the index values cos θil having been calculated for the picture elements, which are located along each of said radial direction lines and fall within the range from a starting point to an end point, said starting point being set at the picture element that is located at the length of distance corresponding to the minimum size of the prospective abnormal pattern to be detected, said end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, (6) calculating the maximum value of said mean values of said index values cos θil, which mean values have been obtained for each of said radial direction lines by successively setting said end point at the picture elements, (7) calculating a total sum of the maximum values, which have been obtained for all of the plurality of said radial direction lines, a value of the degree of centralization of the gradient vector group with respect to said picture element of interest being thereby calculated, (8) comparing the value of said degree of centralization of the gradient vector group, which value has been calculated by the operation of step (7) defined above, and a predetermined threshold value with each other, (9) judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values cos θil having been calculated for each of said radial direction lines, which mean value takes the maximum value in the operation of step (6) defined above,

(13) setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and

(14) connecting the adjacent marginal points, which have been set on the plurality of said radial direction lines, by predetermined lines, the region surrounded by the connecting lines being extracted as the prospective abnormal pattern.

4. A method as defined in claim 3 wherein the connection of the marginal points in the operation of step (14) defined above is carried out with a technique, in which a dynamic curve having an initial shape repeats deformation in accordance with a predetermined deformation tendency and converges.

5. An apparatus for detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the apparatus comprising:

(i) a gradient vector calculating means for calculating a gradient vector of the image signal, the calculation being made for each picture element among all of the picture elements in the radiation image, (ii) a picture-element-of-interest setting means for setting an arbitrary picture element, which is among all of the picture elements in the radiation image, as a picture element of interest, the picture elements being successively set as said picture element of interest, (iii) a detection size setting means for setting the minimum size and the maximum size of the prospective abnormal pattern to be detected, (iv) a direction line setting means for setting a plurality of radial direction lines on the radiation image, said radial direction lines extending radially from said picture element of interest and being adjacent to one another at predetermined angle intervals, (v) an index value calculating means for calculating an index value cos θil for each picture element among the picture elements, which are located along each of said radial direction lines and fall within the range from said picture element of interest to a picture element that is located at a length of distance corresponding to the maximum size of the prospective abnormal pattern to be detected, said index value $\cos\theta il$ being calculated from an angle $\theta il$ that is made between said gradient vector, which has been calculated for said each picture element, and the direction along which said each radial direction line extends, (vi) a maximum value calculating means for calculating a mean value of the index values $\cos\theta il$ having been calculated for the picture elements, which are located along each of said radial direction lines and fall within the range from a starting point to an end point, said starting point being set at said picture element of interest, said end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, said maximum value calculating means extracting the maximum value of said mean values of said index values $\cos\theta il$, which mean values have been obtained for each of said radial direction lines by successively setting said end point at the picture elements, (vii) a centralization degree calculating means for calculating a total sum of the maximum values, which have been obtained for all of the plurality of said radial direction lines, and thereby calculating a value of the degree of centralization of the gradient vector group with respect to said picture element of interest, (viii) a comparison and judgment means for comparing the value of said degree of centralization of the gradient vector group, which value has been calculated by said centralization degree calculating means, and a predetermined threshold value with each other, said comparison and judgment means judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by said maximum value calculating means, said picture element corresponding to the end point being specified with respect to each of said radial direction lines, said marginal point setting means setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and (xi) a contour extracting means for connecting the adjacent marginal points, which have been set on the plurality of said radial direction lines, by predetermined lines, and extracting the region, which is surrounded by the connecting lines, as the prospective abnormal pattern.

6. An apparatus as defined in claim 5 wherein said contour extracting means connects the marginal points, which have been set on the plurality of said radial direction lines, with a technique, in which a dynamic curve having an initial shape repeats deformation in accordance with a predetermined deformation tendency and converges.

7. An apparatus for detecting a prospective abnormal pattern, in which an image signal representing a radiation image of an object is obtained, the image signal being made up of a series of image signal components representing picture elements in the radiation image, and a prospective abnormal pattern is detected from the radiation image in accordance with the image signal, the apparatus comprising:

(i) a gradient vector calculating means for calculating a gradient vector of the image signal, the calculation being made for each picture element among all of the picture elements in the radiation image, (ii) a picture-element-of-interest setting means for setting an arbitrary picture element, which is among all of the picture elements in the radiation image, as a picture element of interest, the picture elements being successively set as said picture element of interest, (iii) a detection size setting means for setting the minimum size and the maximum size of the prospective abnormal pattern to be detected, (iv) a direction line setting means for setting a plurality of radial direction lines on the radiation image, said radial direction lines extending radially from said picture element of interest and being adjacent to one another at predetermined angle intervals, (v) an index value calculating means for calculating an index value $\cos\theta il$ for each picture element among the picture elements, which are located along each of said radial direction lines and fall within the range from a picture element that is located at a length of distance corresponding to the minimum size of the prospective abnormal pattern to be detected, the length of distance being taken from said picture element of interest, to a picture element that is located at a length of distance corresponding to the maximum size of the prospective abnormal pattern to be detected, the length of distance being taken from said picture element of interest, said index value $\cos\theta il$ being calculated from an angle $\theta il$ that is made between said gradient vector, which has been calculated for said each picture element, and the direction along which said each radial direction line extends, (vi) a maximum value calculating means for calculating a mean value of the index values $\cos\theta il$ having been calculated for the picture elements, which are located along each of said radial direction lines and fall within the range from a starting point to an end point, said starting point being set at the picture element that is located at the length of distance corresponding to the minimum size of the prospective abnormal pattern to be detected, said end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, said maximum value calculating means extracting the maximum value of said mean values of said index values cos θil, which mean values have been obtained for each of said radial direction lines by successively setting said end point at the picture elements, (vii) a centralization degree calculating means for calculating a total sum of the maximum values, which have been obtained for all of the plurality of said radial direction lines, and thereby calculating a value of the degree of centralization of the gradient vector group with respect to said picture element of interest, (viii) a comparison and judgment means for comparing the value of said degree of centralization of the gradient vector group, which value has been calculated by said centralization degree calculating means, and a predetermined threshold value with each other, said comparison and judgment means judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by said maximum value calculating means, said picture element corresponding to the end point being specified with respect to each of said radial direction lines, said marginal point setting means setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and (xi) a contour extracting means for connecting the adjacent marginal points, which have been set on the plurality of said radial direction lines, by predetermined lines, and extracting the region, which is surrounded by the connecting lines, as the prospective abnormal pattern.

8. An apparatus as defined in claim 7 wherein said contour extracting means connects the marginal points, which have been set on the plurality of said radial direction lines, with a technique, in which a dynamic curve having an initial shape repeats deformation in accordance with a predetermined deformation tendency and converges.

* * * * *